(12) United States Patent
Taguchi et al.

(10) Patent No.: US 7,012,446 B2
(45) Date of Patent: Mar. 14, 2006

(54) DEVICE FOR DETECTING A MOTOR DRIVE CURRENT

(75) Inventors: Shin Taguchi, Anjo (JP); Hiromichi Agata, Anjo (JP); Masayuki Takenaka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/862,581

(22) Filed: Jun. 8, 2004

(65) Prior Publication Data
US 2004/0251928 A1    Dec. 16, 2004

(30) Foreign Application Priority Data
Jun. 13, 2003   (JP)   ............................. 2003-168775

(51) Int. Cl.
*H01R 4/60*    (2006.01)
*G01R 31/36*    (2006.01)

(52) U.S. Cl. .............. 324/772; 324/117 R; 324/117 H; 324/126

(58) Field of Classification Search ................. 324/772
See application file for complete search history.

(56) References Cited

U.S. PATENT DOCUMENTS 5,253,156 A * 10/1993 Sakurai et al. ................ 363/98
5,589,743 A * 12/1996 King .......................... 318/139
6,775,115 B1 * 8/2004 Sato ............................ 361/23

FOREIGN PATENT DOCUMENTS

JP        A 9-304447        11/1997

* cited by examiner

*Primary Examiner*—Vinh P. Nguyen
(74) *Attorney, Agent, or Firm*—Oliff & Berridge PLC

(57) ABSTRACT

A device for detecting a motor drive current is arranged without substantially requiring additional space. The device for detecting a motor drive current, detects the currents of the phases flowing through the feeder lines that connect the motors to an inverter using a first bus bar for each of the phases arranged in parallel relative to each other and second bus bars extending from the ends of the first bus bars in a direction to intersect the axes of the first bus bar to which attached, by using magnetic field detector elements of each of the phases arranged near the feeder lines, wherein processing means for detecting the currents relying on the magnetic field detector elements of each of the phases are provided on a common circuit board. The magnetic field detector elements are disposed near the first bus bars of each of the phases, and the circuit board is arranged in a space sandwiched between the outermost first bus bars. Thus, the circuit board is arranged without substantially requiring additional space, and the current detecting device is realized in a compact form.

14 Claims, 11 Drawing Sheets

DEVICE FOR DETECTING A MOTOR DRIVE CURRENT

CROSS-REFERENCE TO RELATED APPLICATION

This application claims priority from JP 2003-168775, filed Jun. 13, 2003, the disclosure of which is incorporated in its entirety herein by reference thereto.

BACKGROUND OF THE INVENTION

1. Field of Invention

The invention relates to a device for detecting an electric current for driving an electric motor and, particularly, to a device for detecting a motor drive current that is adapted to being used in a drive unit for electric cars and in a drive unit for hybrid cars.

2. Description of Related Art

An inverter for driving electric motors is required by AC electric motors (in this specification, a motor and a generator, that also works as a motor, are both called electric motors) that are driven by a DC power source, e.g., a storage battery, in a drive unit for electric cars and in a drive unit for hybrid cars. The inverter is controlled based upon control signals which a motor control unit sends to a signal line of the inverter. During power running, a DC current supplied from the battery through a DC power line is converted into currents of the U-, V- and W-phases, and these currents are fed to three-phase coils of the electric motor through three-phase AC power lines. At the time of generation or regeneration, further, the currents of the U-, V- and W-phases generated in the three-phase coils of the electric motor are fed through the three-phase AC power lines, are converted into DC currents, and are supplied to the battery through the DC power line.

A current sensor for detecting a drive current is provided for the three-phase AC power lines that connect the electric motor to the inverter in order to monitor a state where the motor is driven by the inverter and to send data to the motor control unit. FIG. 12 concretely illustrates a conventional manner for arranging the current sensors for the three-phase AC power lines. In the arrangement as shown, a printed board d of a current sensor is arranged near the extended positions a, b and c of three bus bars with the plate surface in parallel with the bus bars. In this arrangement, the printed board d is placed to be in parallel with a plane passing through the axes of the bus bars. If the direction in which the bus bars extend is denoted by the Z-axis, the direction in which the bus bars are arranged by the X-axis, and the direction at right angles therewith by the Y-axis, then, it becomes difficult to decrease the size in the direction of the Y-axis and to decrease the area for arranging the current detector in a direction traversing the bus bars.

In another manner of arranging the current detector, a printed board constituting the current detector is arranged at a portion of current feeder lines (bus bars) (see JP-A-9-304447, page 8, FIG. 4). In this example, the printed board is arranged neighboring the cores that are arranged so as to surround the peripheral surfaces of the plate-like bus bars. The bus bars penetrate through the printed board.

SUMMARY OF THE INVENTION

According to the prior art taught in JP-A-9-304447, however, the current detector is mounted on an inverter housing, and the current is detected by the plate-like bus bar portions. Therefore, the current detector becomes bulky relative to the space for arranging the bus bars. With all bus bars penetrating through the printed board, further, the direction of the bus bars is limited, and the connecting operation is not easy.

The invention addresses the above-mentioned circumstances and a principal object is to arrange a device for detecting a motor drive current without substantially requiring additional space. Another object of the invention is to improve the noise characteristics of the device for detecting a motor drive current.

In order to achieve the above objects, which are not all inclusive, there is provided, for example, a device for detecting a motor drive current, which detects the currents of the phases flowing through the power supply lines connecting the motors to an inverter using first bus bars of each of the phases arranged in parallel relative to each other and second bus bars of each of the phases extending from the ends of the bus bars in a direction to intersect the axes thereof, by using magnetic field detector elements of each of the phases arranged near the power supply lines, wherein processing means for detecting the currents relying on the magnetic field detector elements of each of the phases are provided on a common circuit board, and wherein the magnetic field detector elements are disposed near the first bus bars of each of the phases, and the circuit board is arranged in a space sandwiched between the first bus bars of the outermost side.

In the structure described, it is desired that the circuit board is so arranged that the plate surface thereof is directed in a direction to intersect the axes of the first bus bars of each of the phases. That is, the first bus bars of each of the phases include three parallel bus bars for flowing a three-phase current, and the bus bar located at the center among them penetrates through the circuit board. In any one of the structures, further, the circuit board includes amplifiers for each of the phases for amplifying the signals detected by the magnetic field detector elements of each of the phases, and the amplifiers are arranged to be deviated toward one side on the surface of the circuit board defined by a plane passing through the axes of the first bus bars of each of the phases. The first bus bars of each of the phases are connected to the windings of each of the phases of the motors in the motor casing containing the motors, and are in the form of terminal members penetrating through the motor casing and extending into an inverter casing that contains the inverter.

The invention is also concerned with a device for detecting a motor drive current, which detects the currents of the phases flowing through the power supply lines connecting the motors to an inverter using first bus bars of each of the phases arranged in parallel relative to each other and second bus bars of each of the phases extending from the ends of the first bus bars in a direction to intersect the axes thereof, by using magnetic field detector elements of each of the phases arranged near the power supply lines, wherein processing means for detecting the currents relying on the magnetic field detector elements of each of the phases are provided on a common circuit board, and wherein the circuit board is provided with amplifiers of each of the phases for amplifying the signals detected by the magnetic field detector elements of each of the phases, and the first bus bars of each of the phases are extended from the axes thereof in a direction to intersect the axes thereof and to separate away from the amplifiers so as to be connected to the terminals of each of the phases of the inverter.

BRIEF DESCRIPTION OF THE DRAWINGS

The invention will be described with reference to the drawings, in which.

DETAILED DESCRIPTION OF PREFERRED EMBODIMENTS

Figure 1:
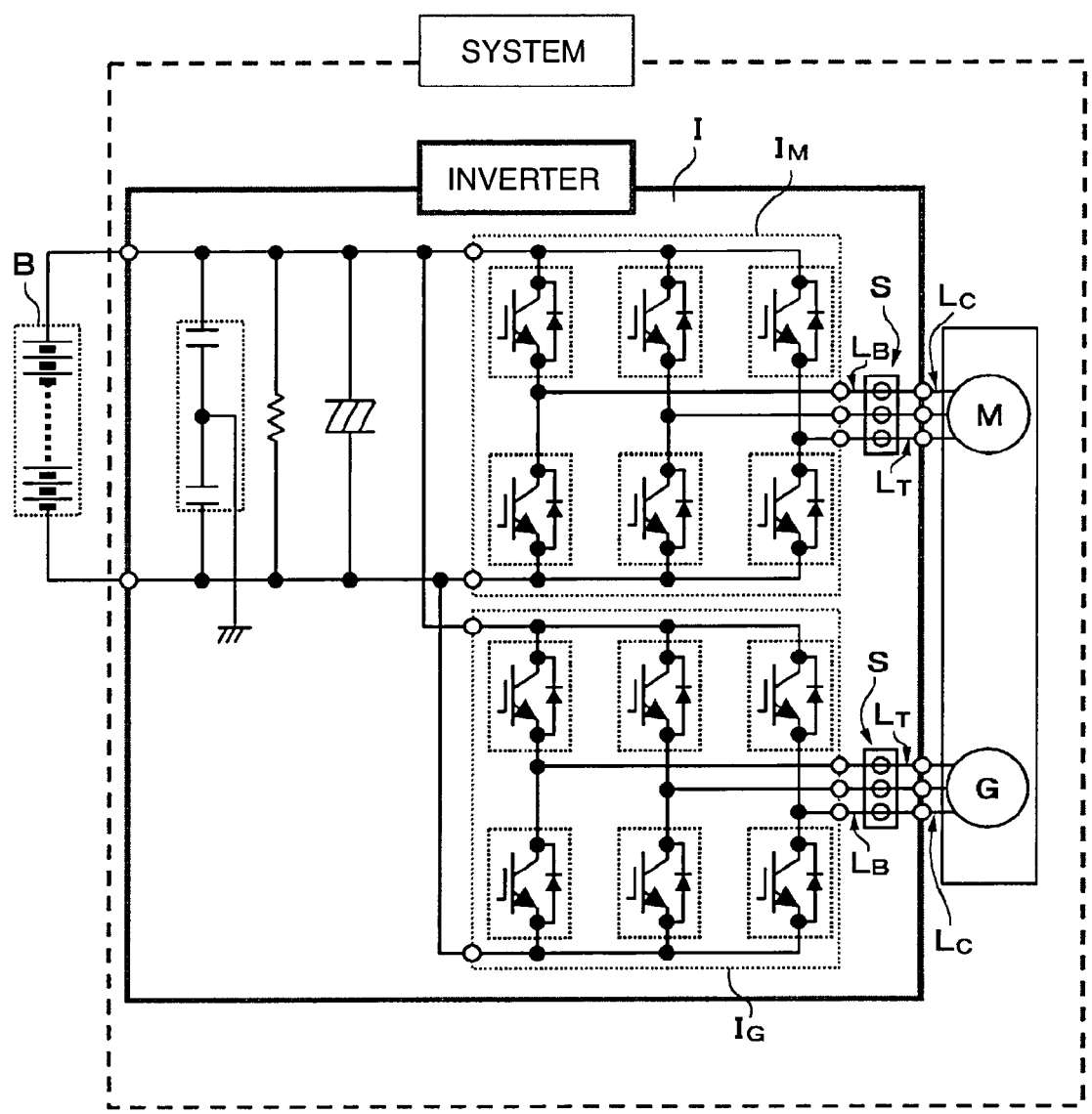
FIG. 1 is a diagram of an electric circuit illustrating a portion to which the invention is applied.

Prior to describing an exemplary embodiment of the invention with reference to the drawings, described below, first, is a circuit diagram illustrating the position for arranging a device for detecting a motor drive current according to the invention. Referring to FIG. 1 illustrating the circuit structure, the current detecting devices S detect the currents flowing through the first bus bars $L_T$ relying upon magnetic field detector elements (not shown) arranged near the first bus bars $L_T$ which are in parallel to connect an inverter I to a motor M and to a generator G which work as two motors. In this example, the inverter I includes two switching element power modules $I_M$, $I_G$ for the motor M and the generator G. The two switching element power modules $I_M$, $I_G$ are connected to a battery B which is a DC power source in parallel with a DC circuit that includes smoothing capacitors and the like. The three-phase terminals of the power modules $I_M$, $I_G$ are connected to the leads $L_c$ of the windings of the motor M and the generator G through second bus bars $L_B$ and first bus bars $L_T$. FIG. 1 does not illustrate a signal circuit for controlling the inverter.

Figure 2:
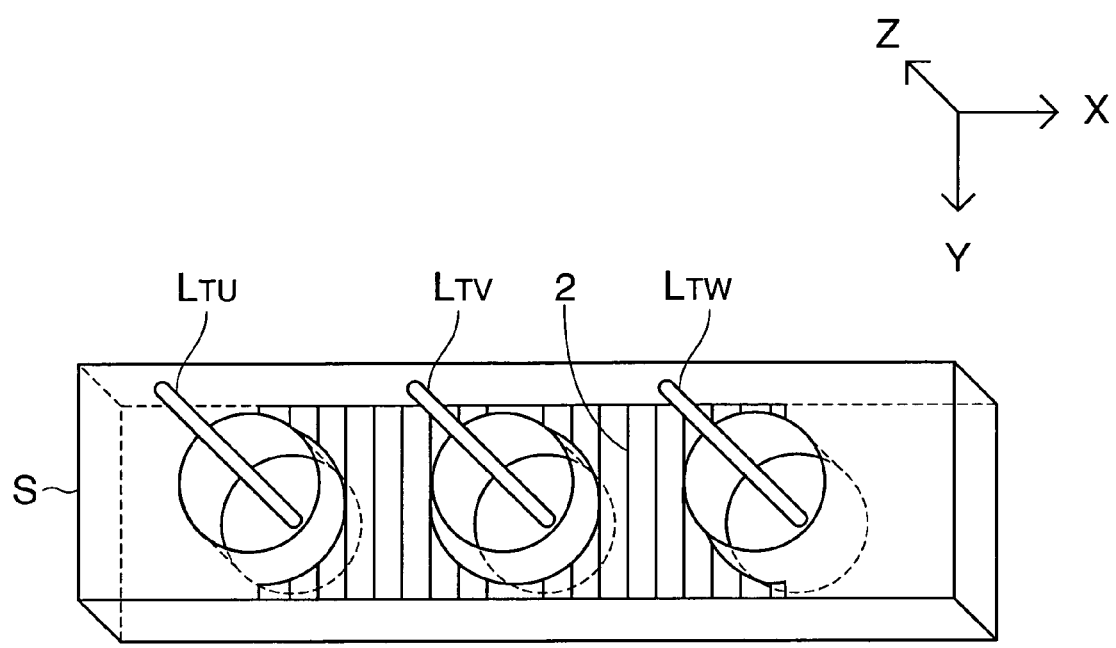
FIG. 2 is a view schematically illustrating the arrangement of a circuit board of a current detecting device according to an exemplary embodiment of the invention.
Figure 3:
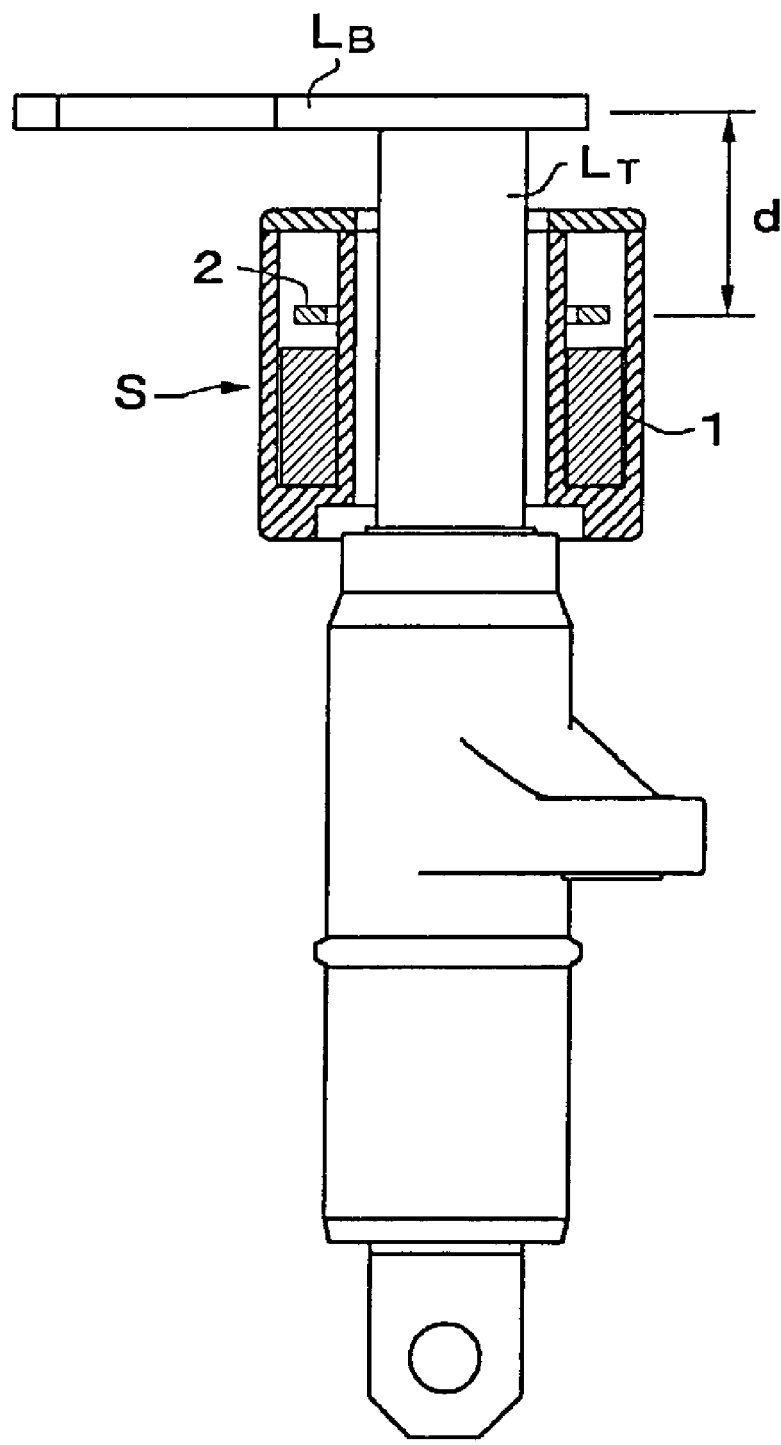
FIG. 3 is a sectional view of a current detecting device according to the embodiment viewed in a transverse direction relative to a direction in which the bus bars are arranged.
Figure 4:
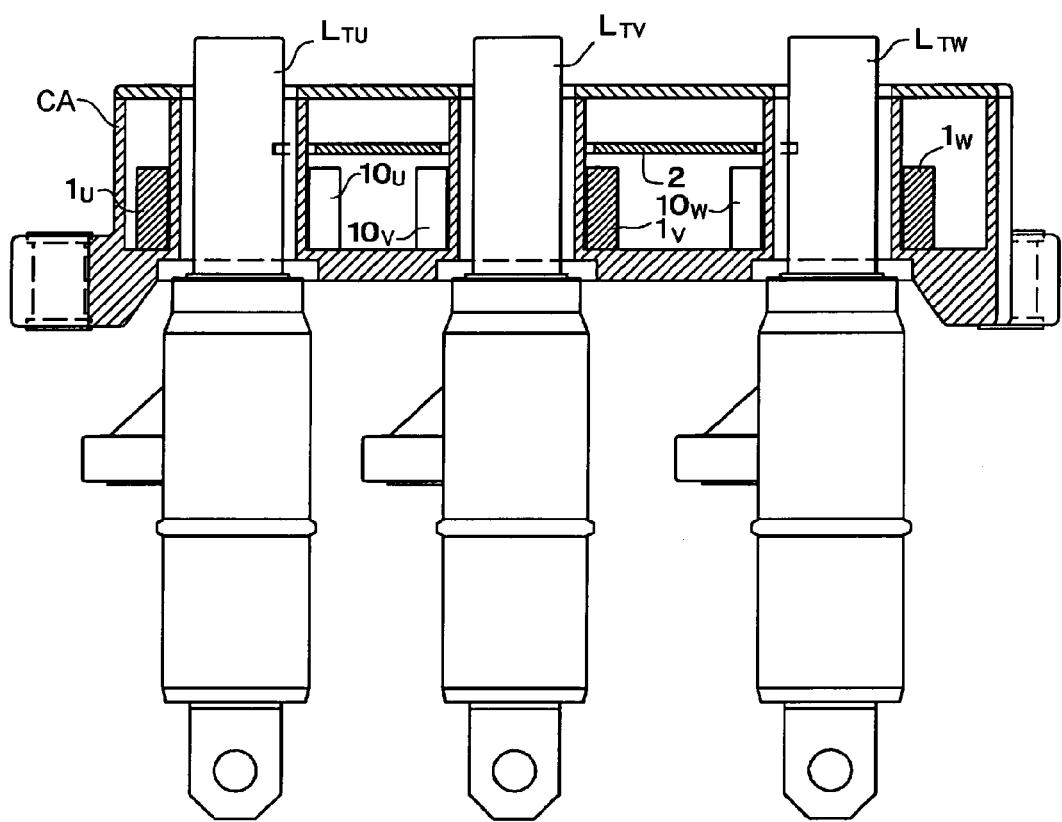
FIG. 4 is a sectional view of the current detecting device according to the embodiment is viewed in a direction in which the bus bars are arranged.

Next, FIG. 2 schematically illustrates the concept, FIG. 3 illustrates, in cross section, a relationship between the individual first bus bars and the current detecting device, and FIG. 4 illustrates, in a side view, a relationship between the first bus bars of three phases and the current detecting device. As shown, the current detecting device S has, on a circuit board 2, processing means (represented generically by reference number 15 in FIGS. 6 and 7) for detecting a current relying upon magnetic field detector elements (not shown). The circuit board 2 is arranged in a space sandwiched between the first bus bars $L_{TU}$ and $L_{TW}$, the outermost bus bars at each side. The first bus bars $L_T$ are connected to the inverter through the second bus bars $L_B$. Further, the first bus bars $L_T$ are also connected to the three-phase terminals of the power modules $I_M$, $I_G$ (see FIG. 1). Thus, the circuit board 2 is arranged in a space sandwiched between the first bus bars $L_{TU}$, $L_{TW}$, at the outermost sides, of the power supply line. Therefore, the circuit board 2 is arranged in the space occupied by the power supply line without substantially requiring additional space. Hence, the current detecting device S is obtained in a compact size. Further, the current detecting portions are formed by portions of the first bus bars $L_T$ closer to the motors M, G than the second bus bars $L_B$ that are directly connected to the inverter I. Therefore, the second bus bars $L_B$ can be freely directed for connection to the inverter I.

Figure 5:
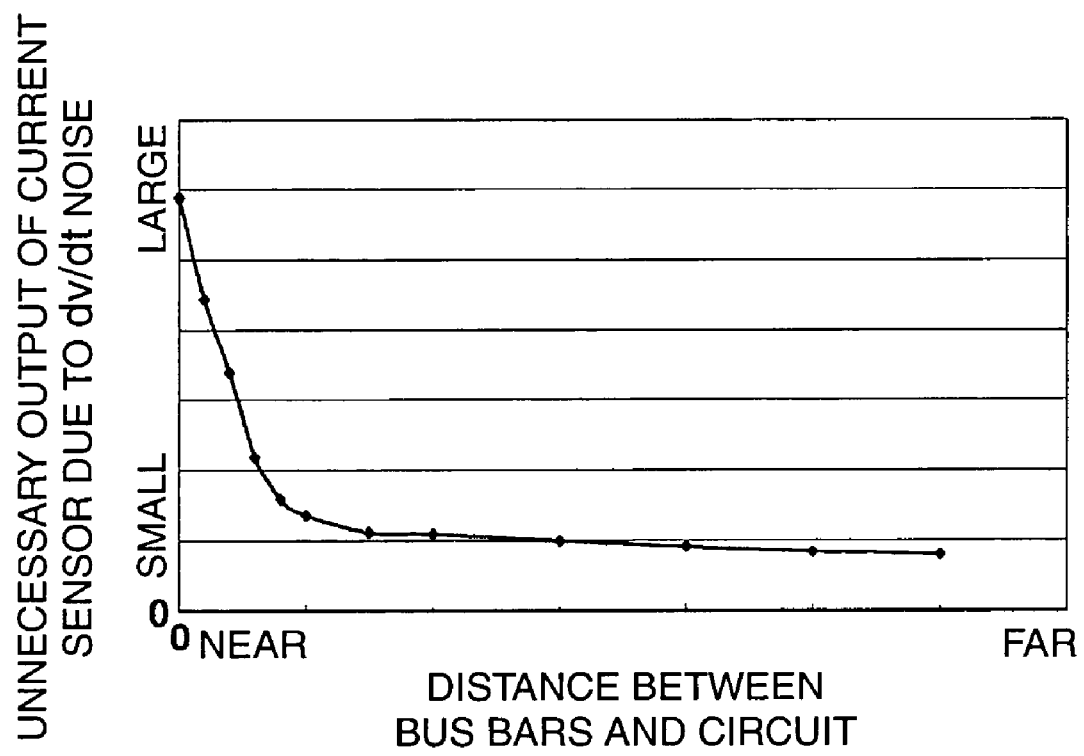
FIG. 5 is a graph illustrating a change in the noise depending upon a distance between the bus bars and the circuit board.

Further, the circuit board 2 is disposed with its plate surface being directed in a direction (X-Y direction in FIG. 2) that intersects the axes of the first bus bars $L_T$. According to this structure, the plate surface of the circuit board 2 is not in parallel with the first bus bars $L_T$, enabling a distance d (see FIG. 3) to be maintained between the second bus bars $L_B$ and the circuit board 2 and preventing an increase in the noise characteristics of the detector device (i.e., an improvement in the detection as less noise is generated) that results when the second bus bars $L_B$ are close to the circuit board 2. A relationship between the distance d and the generated noise is illustrated in FIG. 5. Namely, FIG. 5 illustrates a relationship between the two, wherein the abscissa represents a distance between the bus bars (second bus bars) and the circuit board, and the ordinate represents unnecessary output of the current sensor due to dv/dt noise. It will be understood that the magnitude of noise sharply increases as the distance between the bus bars (second) and the circuit board becomes smaller than a predetermined distance, but remains roughly the same despite the distance when the distance becomes greater than the predetermined value. By finding this predetermined value, therefore, the distance, can be set to separate the second bus bars and the circuit board.

In this embodiment, as illustrated in FIG. 4, the first bus bars $L_T$ comprise three parallel bus bars $L_{TU}$, $L_{TV}$ and $L_{TW}$ for the flow of the three-phase currents. Therefore, the first bus bar $L_{TV}$ located at the center penetrates through the circuit board 2 that is arranged in a space sandwiched between the first bus bars $L_{TU}$, $L_{TW}$ at the outermost sides. This structure enables the space between the first bus bars $L_{TU}$, $L_{TW}$ to be used to a maximum degree for the area of the circuit board 2. As such, the structure offers an advantage in that the area of the circuit board 2 is easily accommodated in the space. According to the structure, the space sandwiched by the outermost first bus bars is used to a maximum degree for the area of the circuit board, enabling the area of the circuit board to be easily accommodated in the space.

Figure 6:
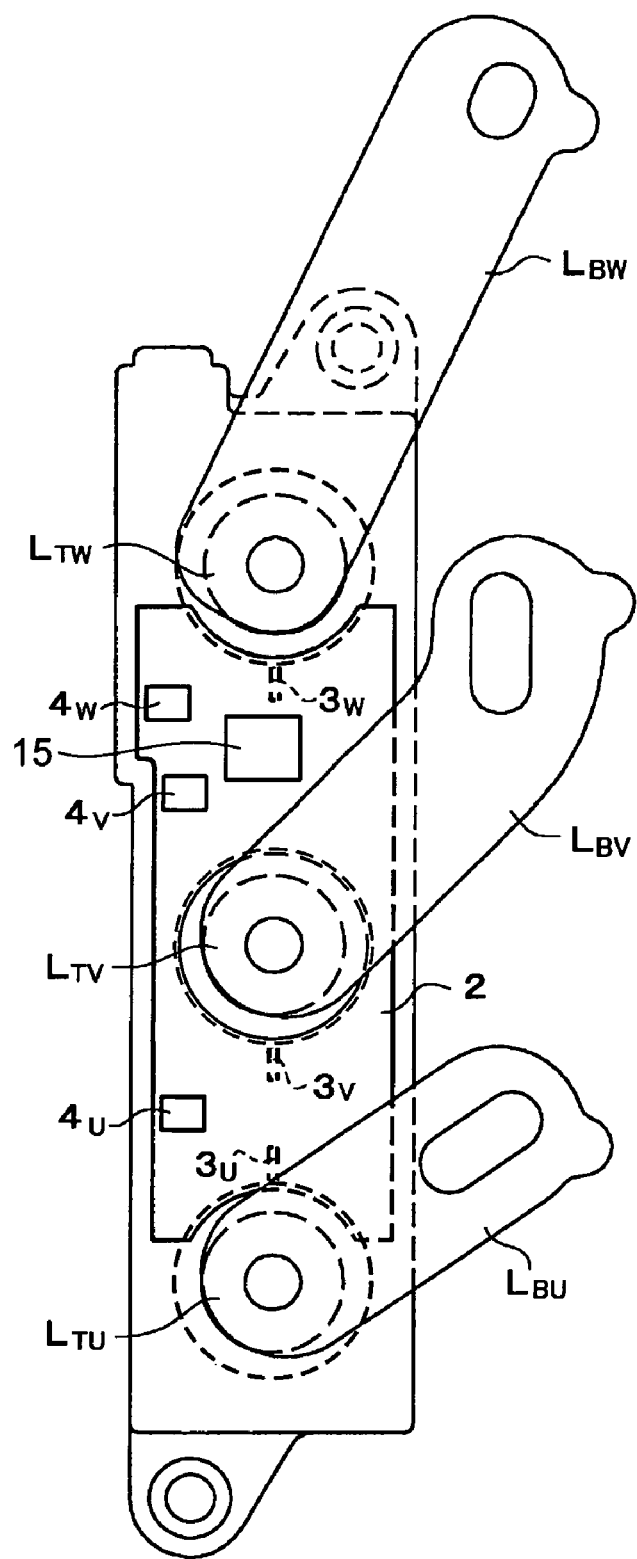
FIG. 6 is a plan view of the current detecting devices according to the embodiment.

Here, as illustrated in FIG. 6, the current detecting device S constitutes detecting portions by placing magnetic field detector elements $3_U$, $3_V$, $3_W$ comprising, usually, Hall elements on the circuit board 2 (on the back side of the substrate) in the slit portions $10_U$, $10_V$, $10_W$ of the cores $1_U$, $1_V$, $1_W$ of the current detecting devices, shown in FIG. 4, arranged so as to surround the first bus bars $L_T$ (i.e, the cores are annular with the slit position at one side so as to have a C-shape when viewed in plan). The circuit board 2 includes circuits for applying currents to the magnetic field detector elements 3 and for amplifying the detected signals. Therefore, the circuit board 2 includes amplifiers (operational amplifiers) $4_U$, $4_V$, $4_W$ as circuit chips for amplifying the signals detected by the magnetic field detector elements 3. The amplifiers 4 generate noise when they are located close to the second bus bars $L_B$ through which heavy currents flow. Here, a feature resides in that the amplifiers 4 are arranged to be deviated to one side (left side in FIG. 6) on the surface of the circuit board 2 relative to a plane passing through the axes of the first bus bars $L_T$. In this structure, the bus bars $L_B$ that connect the first bus bars $L_T$ to the inverter are extended to the side away from the side on which the amplifiers 4 are arranged relative to the plane passing through the axes of the first bus bars $L_T$. This permits the second bus bars $L_B$ to be adjusted for connecting, i.e., permits the second bus bars $L_B$ to be turned about the axes of the first bus bars $L_T$, offering an advantage in decreasing the noise impinging on the detecting device that would result when the bus bars $L_B$ come close to the amplifiers 4.

Because, the amplifiers on the circuit board are deviated toward one side of the surface of the circuit board relative to a plane passing through the axes of the first bus bars so as to not generate noise, the result is the amplifiers can come closer to the second bus bars in relative distance, i.e., height distance d of FIG. 3, although actual distance remains unchanged. That is, the second bus bars connecting the first bus bars to the inverter extend away on the opposite side of the plane than the surface on which the amplifiers are located, in order to decrease the noise impinging on the detecting device (i.e., increase detection) that results when the second bus bars come close to the amplifiers.

If this arrangement is viewed from another aspect, it can be said that the first bus bars $L_T$ are connected to the terminals of the inverters via the second bus bars $L_B$ that extend starting from the axes of the first bus bars $L_T$ in a direction to intersect the axes of the first bus bars $L_T$ and away from the amplifiers 4. The amplifiers 4 on the circuit board 2 generate noise if the second bus bars $L_B$ are brought close thereto. According to this structure, however, the second bus bars $L_B$ extend in a direction to away from the amplifiers 4 starting from the axes of the first bus bars $L_T$ thereby preventing a decrease in the noise characteristics of the detecting device that is caused when the second bus bars $L_B$ are brought close to the amplifiers 4.

Further, because the circuit board is arranged in a space sandwiched between the outermost first bus bars of the feeder line, the circuit board is arranged in the space occupied by the feeder line without substantially requiring additional space, and the current detecting device achieves a compact size. Besides, the portion for detecting current is formed by the first bus bars closer to the motors than the second bus bars that are directly connected to the inverter. Therefore, the second bus bars can be freely directed for being connected to the inverter.

According to such structure, the plate surface of the circuit board is not in parallel with the plane passing through the axes of the first bus bars, enabling a distance to be maintained between the second bus bars and the circuit board and preventing a drop in the noise characteristics of the detector device that results as the second bus bars come close to the circuit board.

Figure 7:
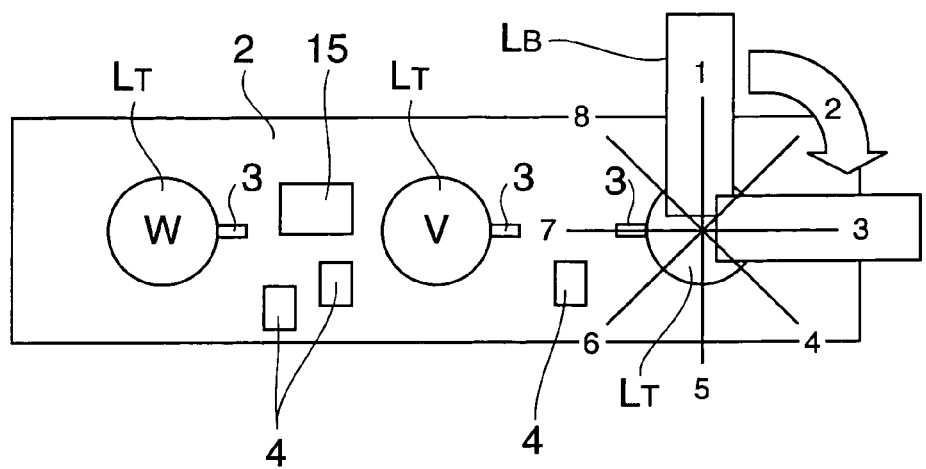
FIG. 7 is a diagram schematically illustrating a method of measuring noise characteristics.
Figure 8:
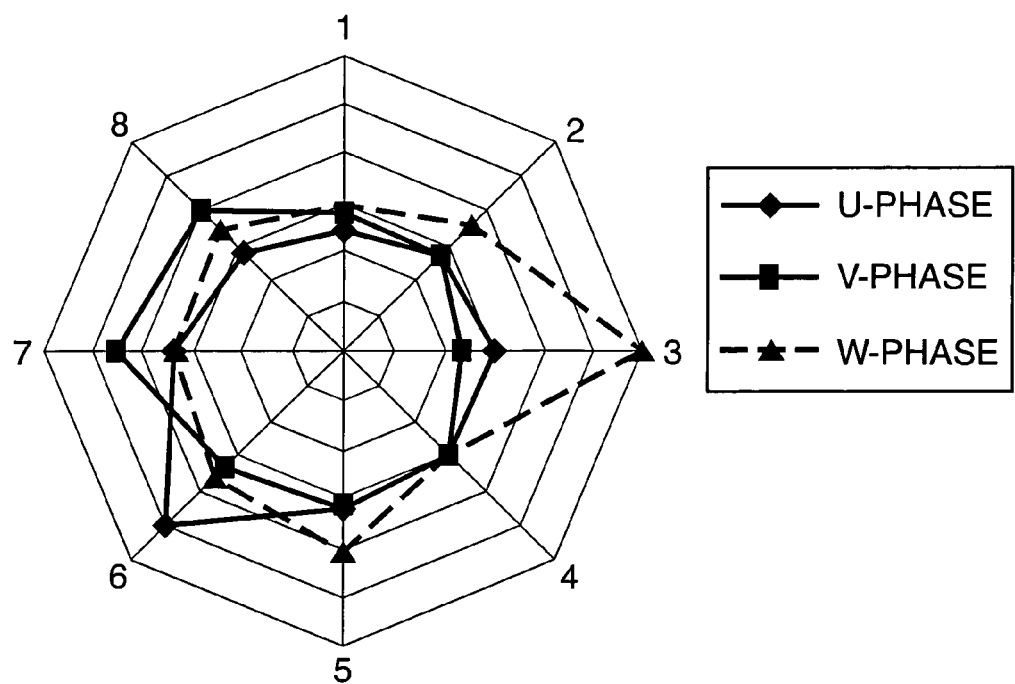
FIG. 8 is a chart illustrating a relationship between the directions in which the bus bars extend and the noise characteristics.

Next, FIGS. 7 and 8 illustrate the occurrence of noise depending upon a positional relationship between the second bus bars $L_B$ and the amplifiers 4. Referring to FIG. 7, when the second bus bar $L_B$ is turned clockwise about the axis of the first bus bar $L_T$ of the U-phase, the noise characteristics are as represented by a thick line connecting rhombic marks in FIG. 8, and noise is generated to a maximum degree in the direction 6 in the drawing. Similarly, when the second bus bar $L_B$ is turned clockwise about the axis of the first bus bar $L_T$ of the V-phase, the noise characteristics are as represented by a thin line connecting the marks ■ in the drawing, and noise is generated to a maximum degree in the direction 7 in the drawing. And, when the second bus bar is turned clockwise about the axis of the first bus bar $L_T$ of the W-phase, the noise characteristics are as represented by a broken line connecting the marks ▲ in the drawing, and noise is generated to a maximum degree in the direction 3 in the drawing. Judging the directions in which the second bus bars $L_B$ extend from the first bus bars $L_T$ of each of the phases in relation to the positions of the amplifiers 4, it can be said that the noise is most effectively decreased as the second bus bars $L_B$ extend in a direction away from the amplifiers 4. In general, the three-phase terminals of the inverter are transversely arranged and, similarly, the first bus bars $L_T$ of three phases are transversely arranged, too. Upon arranging the amplifiers 4 on the circuit board on one side thereof, therefore, the connection that is made to the three-phase terminals of the inverter on the opposite side makes it possible to decrease the noise.

Figure 9:
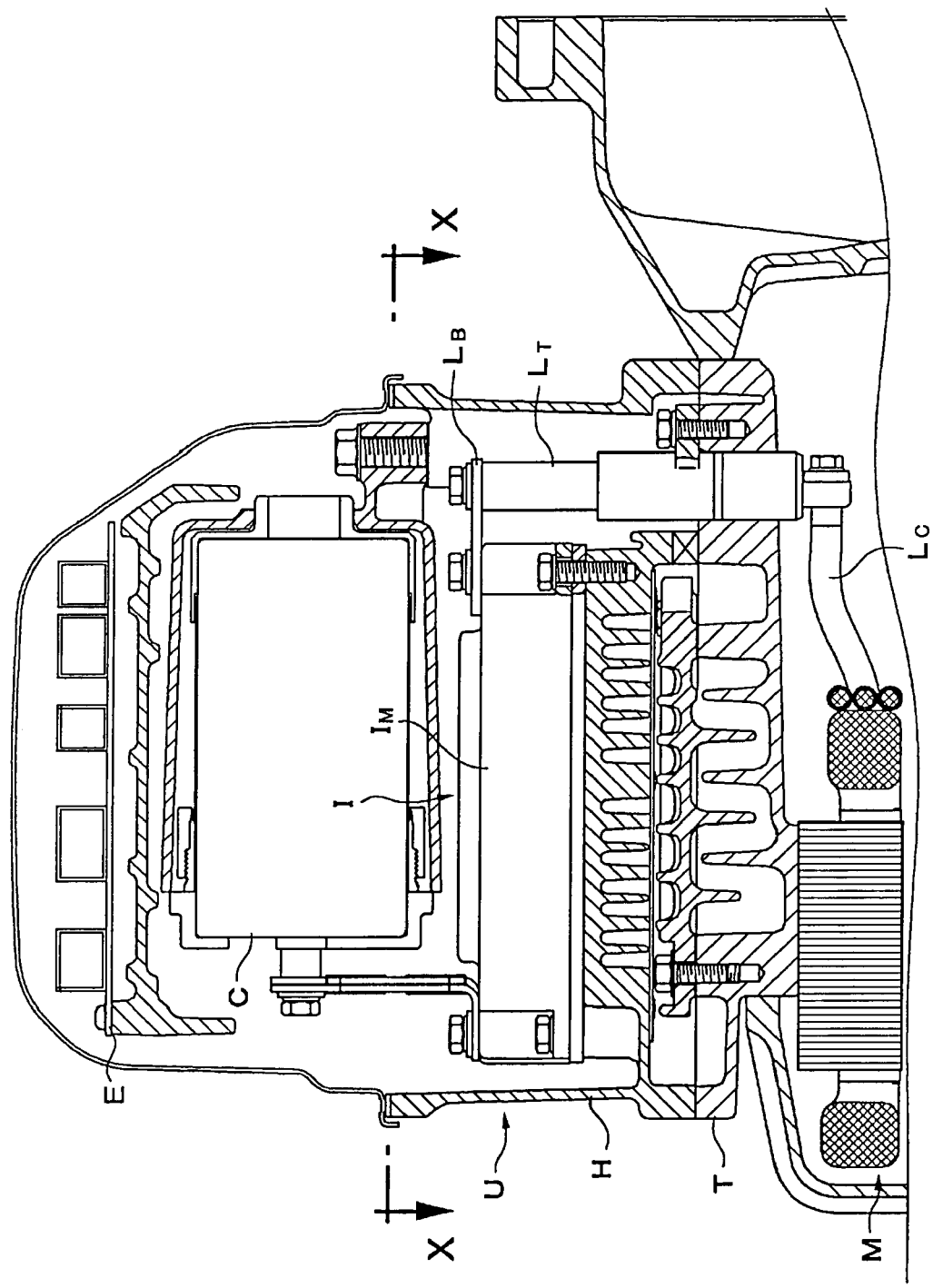
FIG. 9 is a sectional view in the axial direction in which the invention is applied to a hybrid drive unit.

Next, described below is an embodiment in which a structure of the invention is applied to a drive unit for hybrid cars. Referring to FIG. 9, the inverter comprises an inverter unit I comprising chiefly two switching element power modules $I_M$, $I_G$ (FIG. 10), and a capacitor unit C disposed thereon. A control device E is further arranged on an upper portion thereof thereby to constitute a control unit U.

The control device E in this embodiment is an electronic control unit (ECU) comprising chiefly a microcomputer and a memory that stores data and various programs for controlling the entire drive unit. Namely, the control unit E is provided chiefly by a control board having various functional chips arranged on a circuit. The inverter unit I is provided by a circuit board having switching transistors and accompanying circuit chips arranged thereon. The inverter unit I, capacitor unit C and control device E are contained in an inverter casing H which is placed on a drive unit casing that is a motor casing T containing the generator G and the motor M.

The first bus bars $L_T$ are arranged in parallel to connect the motors to the inverter, are connected to the leads $L_C$ of the windings of the motors in the motor casing T containing the motors, are constituted as terminal members penetrating through the motor casing T, extending into the inverter casing H, that contains the inverter, and have outer peripheral surfaces of the form of a solid axle in cross section that are covered with an insulator.

The inverter casing H, which is a base plate of the inverter unit I is made of cast aluminum for radiating heat and for decreasing weight, and has a frame structure of the form of a short rectangular cylinder with bottom having such a sectional shape that meets the two switching element power modules $I_M$ and $I_G$ arranged neighboring each other (in FIG. 9, they are arranged in a direction to be one behind the other relative to the surface of the paper, and one module only is seen) and further meets the arrangement of six terminal members $L_{TU}$, $L_{TV}$, $L_{TW}$ arranged in a row for connection to the three-phase AC power line (see FIG. 1) on one side in parallel.

The switching element power modules $I_M$, $I_G$ are intimately contacted to the upper surface of the inverter casing H, that is a cut and finished part of the heat sink integral with the elevated bottom wall of the inverter casing H, holding the power modules, and they are directly secured by bolts being intimately contacted to the surface thereof to maintain a maximum of contact area.

The control unit of this embodiment is such that among the parts constituting the control unit, the switching element power modules $I_M$, $I_G$, that deal with heavy currents and that generate large amounts of heat due to the constituent chips therein, are arranged on the bottom wall surface at the lowermost part in the control unit so as to be cooled by contact with the heat sink constituted by the bottom wall of the inverter casing H. The capacitor unit C for the smoothing circuit of the inverter is arranged on the upper portion thereof as described above, and the control substrate E is arranged on the capacitor unit C. The capacitor unit C and the control substrate E protrude upward beyond the height of the inverter casing H and, hence, the upper part of the inverter casing H is covered by a cover that swells upward.

The current detecting devices S are arranged in a form of being fitted to the switching element power modules $I_M$, $I_G$ arranged as described above, and fitted to the protruded portions of the six terminal members $L_{TU}$, $L_{TV}$, $L_{TW}$ protruding into the inverter casing H neighboring the power modules. Referring to FIG. 4, the cores 1 constituting the current detecting device S and the circuit board 2 are contained in casings CA (FIGS. 4, 10 and 11) for securing to the inverter casing H. Due to this fitting, the cores 1 are positioned at the lowermost portions of the protruded portions of the terminal members $L_{TU}$, $L_{TV}$, $L_{TW}$ and are so set that the field detecting elements $3_U$, $3_V$, $3_W$ shown in FIG. 6, are disposed in the slit portions $10_U$, $10_V$, $10_W$.

After the current detecting devices S are incorporated, the six plate-like bus bars $L_{BU}$, $L_{BV}$, $L_{BW}$, which are the second bus bars, are respectively secured at their both ends to the heads of the terminal members $L_{TU}$, $L_{TV}$, $L_{TW}$ and to the three-phase terminals of the switching element power modules $I_M$, $I_G$ by bolts to complete the connection of the power lines.

Figure 10:
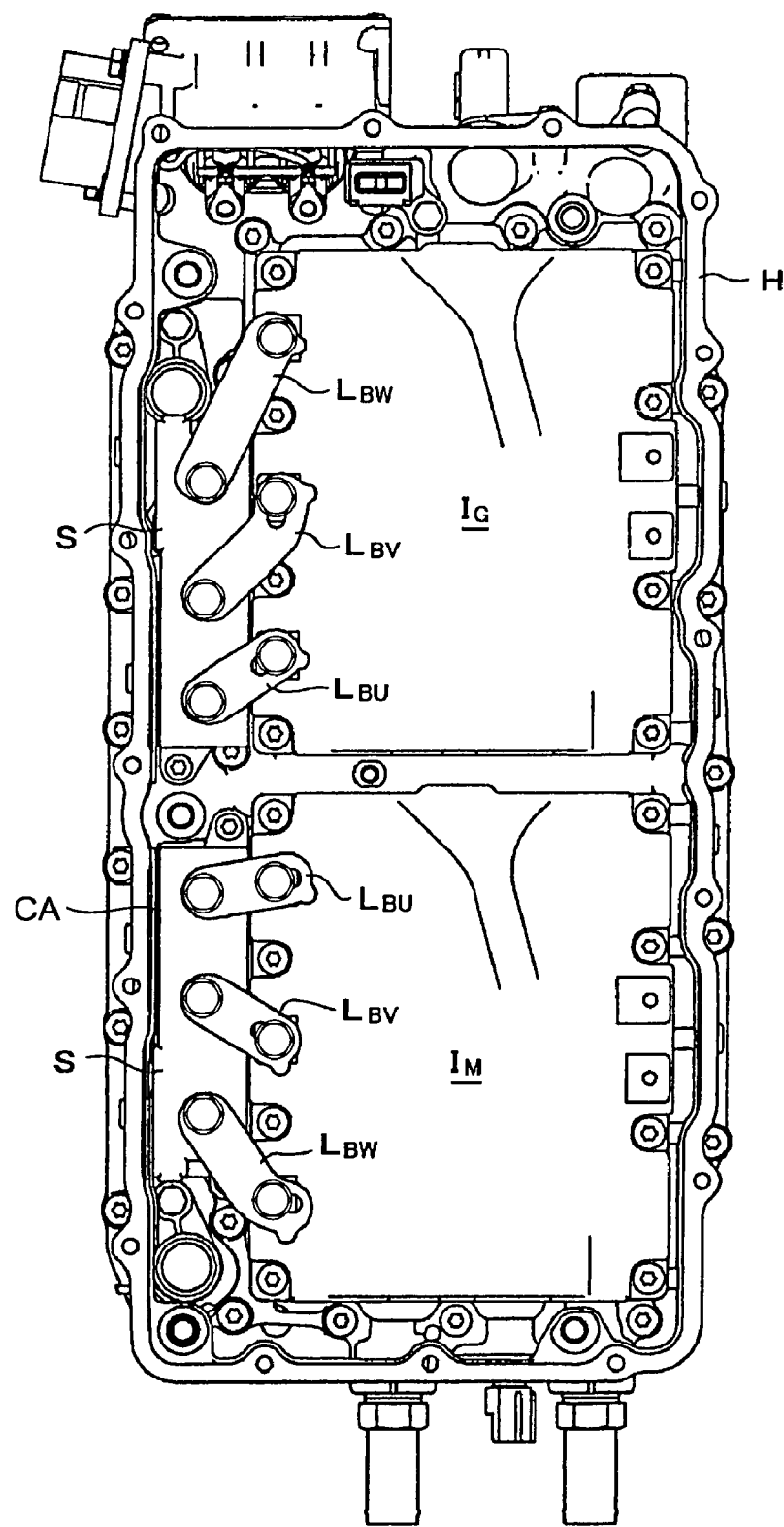
FIG. 10 is a plan cross-section along an arrow X—X in FIG. 9 with the upper parts removed.
Figure 11:
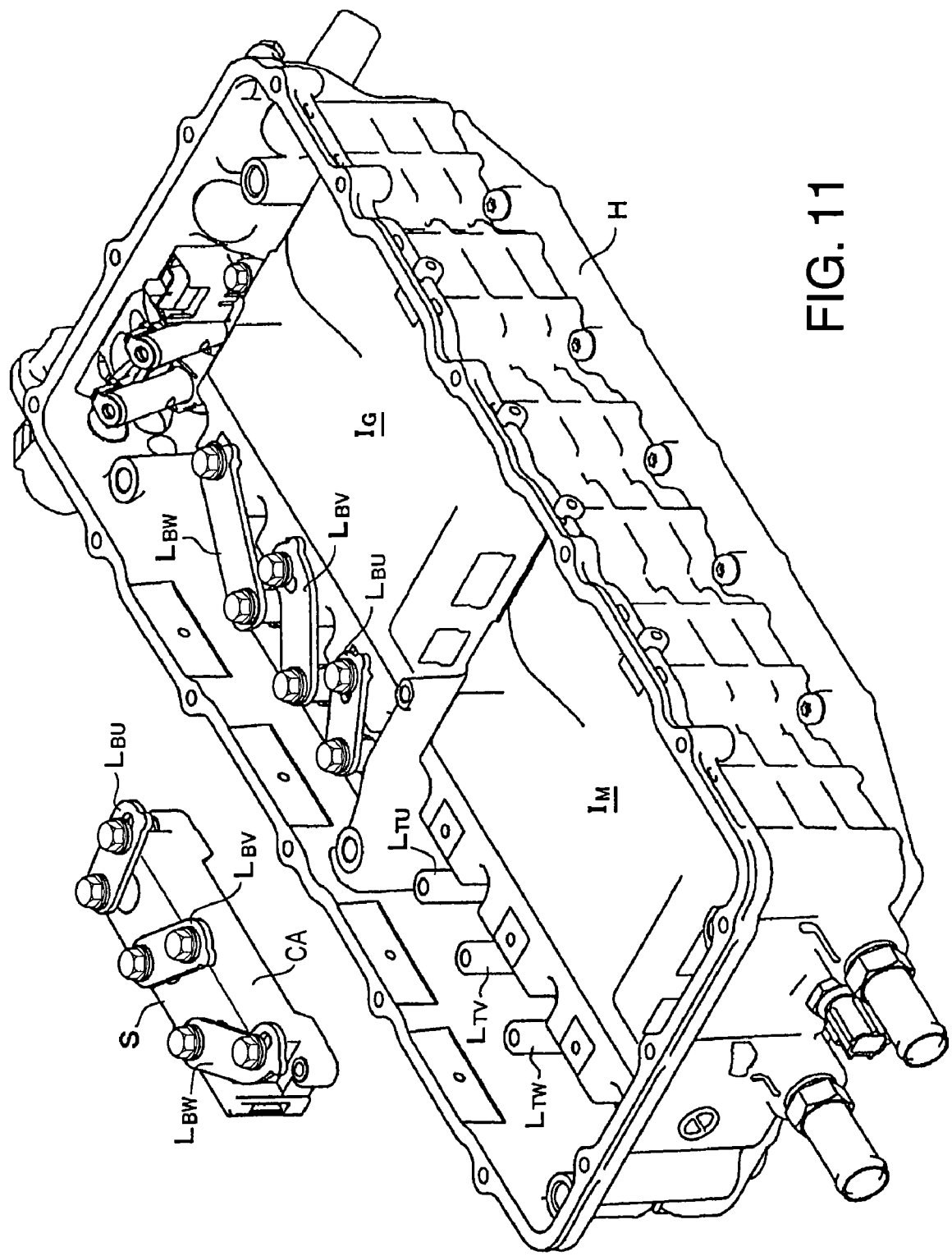
FIG. 11 is a perspective view illustrating, partly in a disassembled manner, the arrangement of the current detecting device according to the embodiment.
Figure 12:
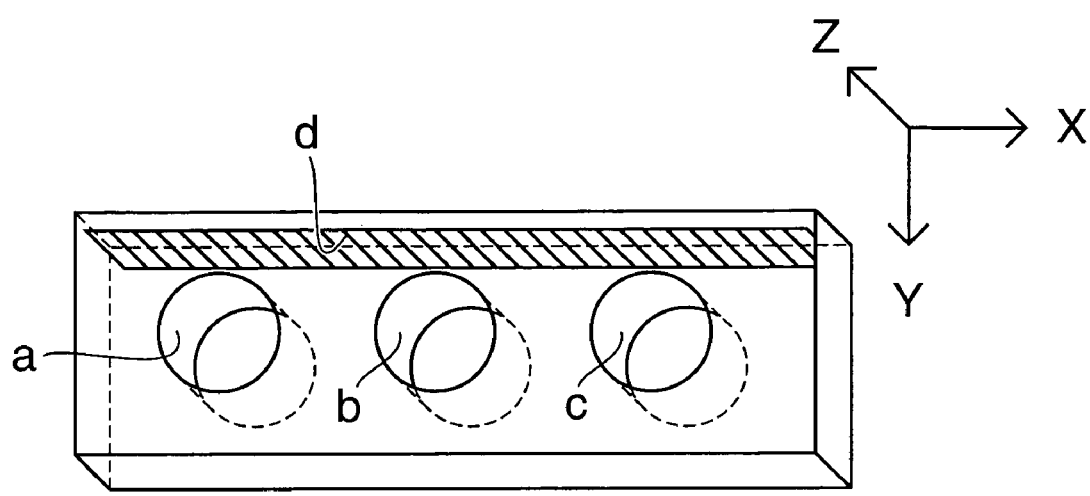
FIG. 12 is a view schematically illustrating the arrangement of a printed substrate in a conventional current detecting device.

According to this embodiment, as described above in detail, the feeder lines of the hybrid drive unit can be efficiently connected by using the first and second bus bars $L_T$, $L_B$. Besides, as illustrated in FIG. 10, the current detecting devices S are arranged in nearly the same spaces as the spaces occupied by the six terminal members $L_{TU}$, $L_{TV}$, $L_{TW}$. Thus, the arrangement of the circuit board of the invention offers advantages from the standpoint of both space and easily directing the bus bars $L_{BU}$, $L_{BV}$, $L_{BW}$. Other effects obtained are as described.

Thus, because the second bus bars extend in a direction to separate away from the amplifiers starting from the axes of the first bus bars, in contrast with the structure in which the amplifiers are mounted on the circuit board and become a cause of generating noise as the second bus bars are located close thereto, this structure prevents a decrease in the noise characteristics of the device (i.e., improves detection) for detecting a current caused by the second bus bars that come close to the amplifiers. As a result, the above-mentioned effects are accomplished by a device in which an inverter casing is mounted on a motor casing in order to arrange the motors and the inverter integrally.

Although the invention was described above so as to detect the currents of three phases, the invention can be further applied to detecting the current of any two phases among the three phases or to detecting the two-phase current, as a matter of course. Further, though the embodiment has dealt with a drive unit for hybrid cars, it should be noted that the invention is in no way limited to this embodiment only but can also be widely applied to any apparatus for controlling the drive by an inverter, such as a drive unit for electric cars using, at least, electric motors. Namely, the invention can be put into practice by modifying the structure without departing from the scope of the invention.

What is claimed is:

1. A device for detecting a motor drive current having multiple phases, which detects a current of each phase flowing though a power supply line,
   the power supply line connecting a motor and an inverter by a plurality of first bus bars, a first bus bar for each phase, the plurality of first bus bars arranged substantially in parallel, and a plurality of second bus bars, a second bus bar for each phase extending from an end of the first bus bar of the same phase in a direction to intersect an axis of the first bus bar, the device comprising:
   a plurality of magnetic field detectors, a magnetic field detector element for each phase that detects the phase current;
   a circuit board; and
   processing means for the detection of the current of each phase of the multiple phases by the magnetic field detector element of the phase on the circuit board, wherein the magnetic field detector element for each phase is disposed near the first bus bar of the same phase, and the circuit board is disposed in a space between outermost first bus bars of the plurality of first bus bars.

2. The device for detecting a motor drive current according to claim 1, wherein the circuit board is so arranged that the plate surface thereof is directed in a direction to intersect the axes of the plurality of first bus bars.

3. The device for detecting a motor drive current according to claim 2, wherein the plurality of first bus bars include three parallel bus bars for flowing a three-phase current, and the first bus bar located at the center among the plurality of first bus bars penetrates through the circuit board.

4. The device for detecting a motor drive current according to claim 3, wherein the circuit board includes a plurality of amplifiers, an amplifier for each of the phases for amplifying the signals detected by the magnetic field detector elements of each of the phases, and the plurality of amplifiers are arranged to be deviated toward one side on the surface of the circuit board defined by a plane passing through the axes of the plurality of first bus bars.

5. The device for detecting a motor drive current according to claim 2, wherein the circuit board includes a plurality of amplifiers, an amplifier for each of the phases for amplifying the signals detected by the magnetic field detector elements of each of the phases, and the plurality of the amplifiers are arranged deviated toward one side on the surface of the circuit board defined by a plane passing through the axes of plurality of the first bus bars.

6. A device for detecting a motor drive current having multiple phases, which detects a current of each phase flowing though a power supply line,
   the power supply line connecting a motor and an inverter by a plurality of first bus bars, a first bus bar for each phase, the plurality of first bus bars arranged substantially in parallel, and a plurality of second bus bars, a second bus bar for each phase extending from an end of the first bus bar of the same phase in a direction to intersect an axis of the first bus bar, the device comprising:
   plurality of magnetic field detectors, a magnetic field detector element for each phase that detects the phase current;

a circuit board; and processing means for the detection of the current of each phase of the multiple phases by the magnetic field detector element of the phase on the circuit board, wherein the circuit board is also provided with a plurality of amplifiers, an amplifier for each of the phases for amplifying the signal detected by the magnetic field detector element for each phase, and each second bus bar of the plurality of second bus bars extends from the axis of a corresponding first bus bar in a direction to intersect the axis of the corresponding first bus bar in a direction away from the amplifiers to be connected to a terminal of one of the phases of an inverter.

7. A device for detecting a motor drive current, comprising:
a plurality of first bus bars extending in parallel;
a circuit board extending between outermost first bus bars and perpendicular thereto;
a current sensor for each first bus bar of the plurality of bus bars;
an amplifier associated with each current sensor mounted to the circuit board; and
a plurality of second bus bars, a second bus bar mounted to each one of the first bus bars to extend perpendicularly thereto, wherein the amplifiers are mounted on one side of a surface of the circuit board defined by a plane passing through the axes of the plurality of first bus bars, and the second bus bars extend in the direction of the other side of the surface of the circuit board and away from the amplifiers.

8. The device according to claim 7, wherein the second bus bars and the circuit board are substantially parallel to one another.

9. The device according to claim 7, wherein each current sensor includes a magnetic field detector element mounted on the circuit board.

10. The device according to claim 7, wherein the first bus bars include three parallel bus bars for flowing a three-phase current, and the bus bar located at the center among them penetrates through the circuit board.

11. A device, for detecting a motor drive current having multiple phases, which detects a current of each phase, comprising:
a plurality of first bus bars, a first bus bar for each phase, the plurality of first bus bars arranged substantially in parallel;
a plurality of second bus bars, a second bus bar for each phase extending from an end of the first bus bar of the same phase in a direction to intersect an axis of the first bus bar;
a plurality of magnetic field detectors, a magnetic field detector element for each phase that detects the phase current;

a circuit board; and processing means for the detection of the current of each phase of the multiple phases, by the magnetic field detector element of the phase, on the circuit board, wherein the magnetic field detector element for each phase is disposed near the first bus bar of the same phase, and the circuit board is disposed in a space between outermost first bus bars of the plurality of first bus bars.

12. The device for detecting a motor drive current according to claim 11, wherein each first bus bar of the plurality of first bus bars is connected to a winding of a corresponding phase of the motor in a motor casing, and is in the form of a terminal member penetrating through the motor casing and extending into an inverter casing that contains the inverter.

13. A device for detecting a motor drive current having multiple phases, which detects a current of each phase, the device comprising:
a plurality of first bus bars, a first bus bar for each phase, the plurality of first bus bars arranged substantially in parallel;
a plurality of second bus bars, a second bus bar for each phase extending from an end of the first bus bar of the same phase in a direction to intersect an axis of the first bus bar;
a plurality of magnetic field detectors, a magnetic field detector element for each phase that detects the phase current;
a circuit board; and
processing means for the detection of the current of each phase of the multiple phases, by the magnetic field detector element of the phase, on the circuit board, wherein the circuit board is also provided with a plurality of amplifiers, an amplifier for each of the phases for amplifying the signal detected by the magnetic field detector element for each phase, and each second bus bar of the plurality of second bus bars extends from the axis of a corresponding first bus bar in a direction to intersect the axis of the corresponding first bus bar in a direction away from the amplifiers to be connected to a terminal of one of the phases of an inverter.

14. The device for detecting a motor drive current according to claim 13, wherein each first bus bar of the plurality of first bus bars is connected to a winding of a corresponding phase of the motor in a motor casing and is in the form of a terminal member penetrating through the motor casing and extending into an inverter casing that contains the inverter.

* * * * *